(12) United States Patent
Liu (10) Patent No.: US 9,279,996 B2
(45) Date of Patent: Mar. 8, 2016

(54) 3D PROJECTION OPTICAL SYSTEM AND DUAL-CHIP LIGHT SPLITTING AND LIGHT COMBINING MODULE THEREOF

(75) Inventor: Meihong Liu, Quzhou (CN)

(73) Assignee: ZHEJIANG ESTAR DISPLAY TECH CO., LTD., Quzhou, Zhejiang Province (CN)

( * ) Notice: Subject to any disclaimer, the term of this patent is extended or adjusted under 35 U.S.C. 154(b) by 172 days.

(21) Appl. No.: 14/114,209

(22) PCT Filed: Dec. 28, 2011

(86) PCT No.: PCT/CN2011/084786
§ 371 (c)(1),
(2), (4) Date: Oct. 26, 2013

(87) PCT Pub. No.: WO2012/146043
PCT Pub. Date: Nov. 1, 2012

(65) Prior Publication Data
US 2014/0055753 A1    Feb. 27, 2014

(30) Foreign Application Priority Data

Apr. 26, 2011  (CN) .......................... 2011 1 0105398

(51) Int. Cl.
G03B 21/26    (2006.01)
G02B 27/26    (2006.01)
H04N 9/31     (2006.01)
G02B 27/28    (2006.01)
(Continued)

(52) U.S. Cl.
CPC .............. *G02B 27/26* (2013.01); *G02B 27/283* (2013.01); *G03B 21/2073* (2013.01); *G03B 35/26* (2013.01); *H04N 9/3167* (2013.01); *H04N 9/3197* (2013.01)

(58) Field of Classification Search
CPC . H04N 9/3114; H04N 9/3167; H04N 9/3197; G02B 27/26; G02B 27/283
USPC ...................... 353/7, 8, 20, 33, 37, 81, 94, 99; 359/485.06, 485.07, 583, 634; 348/338, 339, 743–747; 349/5, 7–9, 349/114
See application file for complete search history.

(56) References Cited

U.S. PATENT DOCUMENTS 5,982,541 A * 11/1999 Li ......................... H04N 9/3105
                                                      348/E9.027
5,986,815 A * 11/1999 Bryars ......................... 359/634
6,676,260 B2 * 1/2004 Cobb .................... H04N 9/3164
                                                      348/E5.141
(Continued)

FOREIGN PATENT DOCUMENTS

CN    101308319 A    11/2008
CN    101377571 A     3/2009
(Continued)

*Primary Examiner* — Sultan Chowdhury
(74) *Attorney, Agent, or Firm* — Cheng-Ju Chiang (57) ABSTRACT

A dual-chip light splitting and light combining module is provided, which comprises a light splitting prism, a first mirror, a first polarizing TIR prism, a first displaying chip, a second mirror, a second TIR prism, a second displaying chip and a light combining prism. The dual-chip light splitting and light combining module is adapted to split an incident non-polarized light into a first polarized light and a second polarized light and combine the first polarized light and the second polarized light together. Also, a 3D projection optical system comprising the dual-chip light splitting and light combining module is provided.

13 Claims, 8 Drawing Sheets

(51) Int. Cl.
*G03B 21/20* (2006.01)
*G03B 35/26* (2006.01)

(56) References Cited

U.S. PATENT DOCUMENTS

| | | | |
|---|---|---|---|
| 7,673,993 B2* | 3/2010 | Ma et al. | 353/20 |
| 7,891,818 B2* | 2/2011 | Christensen et al. | 353/31 |
| 8,220,931 B2* | 7/2012 | Silverstein et al. | 353/20 |
| 2006/0023172 A1* | 2/2006 | Ikeda et al. | 353/94 |
| 2010/0296170 A1* | 11/2010 | Mayer et al. | 359/634 |

FOREIGN PATENT DOCUMENTS

| | | |
|---|---|---|
| JP | 2004-205919 A | 7/2004 |
| TW | 200916828 A | 4/2009 |
| TW | 200916830 A | 4/2009 |
| WO | 2008/003163 A1 | 1/2008 |

* cited by examiner

3D PROJECTION OPTICAL SYSTEM AND DUAL-CHIP LIGHT SPLITTING AND LIGHT COMBINING MODULE THEREOF

CROSS REFERENCE TO RELATED APPLICATIONS

The present application is a 35 U.S.C. §371 National Phase conversion of International (PCT) Patent Application No. PCT/CN2011/084786, filed on Dec. 28, 2011, the disclosure of which is incorporated by reference herein. The PCT International Patent Application was filed and published in Chinese.

FIELD OF THE INVENTION

The present disclosure generally relates to projection instruments, and more particularly, to a three-dimensional (3D) projection optical system and a dual-chip light splitting and light combining module thereof.

BACKGROUND OF THE INVENTION

Currently, the prevailing 3D projection optical systems commercially used are active stereoscopic displaying systems. In an active stereoscopic displaying system, a projector having a refreshing frequency of about 120 Hz is used to output a left-eye frame and a right-eye frame alternately and, meanwhile, a pair of LCD stereoscopic eyeglasses switched on alternately is used for synchronous switching so that separation of the left-eye frame and the right-eye frame from each other is achieved. This delivers a good stereoscopic effect. However, the active stereoscopic eyeglasses have a relatively high cost, frequent switching of the stereoscopic eyeglasses makes the eyes uncomfortable, and propagation of light through the LCD stereoscopic eyeglasses leads to significant loss in brightness. Furthermore, in order to achieve the 3D function, the refreshing frequency of the microelectromechanical system (MEMS) mirror chip must be at least 120 Hz, which represents a high requirement on the refreshing frequency of the chip.

SUMMARY OF THE INVENTION

To solve the aforesaid problems, the present disclosure provides a three-dimensional (3D) projection optical system and a dual-chip light splitting and light combining module thereof.

The present disclosure provides a dual-chip light splitting and light combining module, comprising a polarizing light splitting prism, a first mirror, a first polarizing total internal reflection (TIR) prism, a first displaying chip, a second mirror, a second polarizing TIR prism, a second displaying chip and a light combining prism. The polarizing light splitting prism is adapted to split an incident non-polarized light into a first polarized light and a second polarized light perpendicular to each other. The first polarized light is reflected by the first mirror to the first polarizing TIR prism, reflected by the first TIR prism to the first displaying chip, redirected by the first displaying chip to the first polarizing TIR prism, and then transmitted into the light combining prism via the first polarizing TIR prism. The second polarized light is reflected by the second mirror to the second polarizing TIR prism, reflected by the second TIR prism to the second displaying chip, redirected by the second displaying chip to the second polarizing TIR prism, and then transmitted into the light combining prism via the second polarizing TIR prism. The light combining prism is adapted to combine the incident first polarized light with the incident second polarized light.

According to a preferred embodiment of the present disclosure, the first displaying chip is one of a microelectromechanical system (MEMS) mirror or a digital mirror device (DMD); and the second displaying chip is one of an MEMS mirror or a DMD.

According to a preferred embodiment of the present disclosure, the first displaying chip and the second displaying chip have a refreshing frequency of 60 Hz.

The present disclosure also provides a dual-chip light splitting and light combining module, which comprises a light splitting prism, a first mirror, a first polarizing TIR prism, a first displaying chip, a second mirror, a second polarizing TIR prism, a second displaying chip and a light combining prism. The light splitting prism is adapted to split an incident non-polarized light into a first polarized light and a second polarized light. The first polarized light is reflected by the first mirror to the first polarizing TIR prism, reflected by the first TIR prism to the first displaying chip, redirected by the first displaying chip to the first polarizing TIR prism, and then transmitted into the light combining prism via the first polarizing TIR prism. The second polarized light is reflected by the second mirror to the second polarizing TIR prism, reflected by the second TIR prism to the second displaying chip, redirected by the second displaying chip to the second polarizing TIR prism, and then transmitted into the light combining prism via the second polarizing TIR prism. The light combining prism is adapted to combine the incident first polarized light with the incident second polarized light.

According to a preferred embodiment of the present disclosure, the light splitting prism is a polarizing light splitting prism.

According to a preferred embodiment of the present disclosure, the light splitting prism is adapted to split the incident non-polarized light into the first polarized light and the second polarized light perpendicular to each other.

According to a preferred embodiment of the present disclosure, the first displaying chip is one of an MEMS mirror or a DMD; and the second displaying chip is one of an MEMS mirror or a DMD.

According to a preferred embodiment of the present disclosure, the first displaying chip and the second displaying chip have a refreshing frequency of 60 Hz.

The present disclosure further provides a three-dimensional (3D) projection optical system, which comprises a light source shaping lens, a dual-chip light splitting and light combining module, and an imaging lens. The dual-chip light splitting and light combining module comprises a light splitting prism, a first mirror, a first polarizing TIR prism, a first displaying chip, a second mirror, a second polarizing TIR prism, a second displaying chip and a light combining prism. The light splitting prism is adapted to split a non-polarized light incident from the light source shaping lens into a first polarized light and a second polarized light. The first polarized light is reflected by the first mirror to the first polarizing TIR prism, reflected by the first TIR prism to the first displaying chip, redirected by the first displaying chip to the first polarizing TIR prism, and then transmitted into the light combining prism via the first polarizing TIR prism. The second polarized light is reflected by the second mirror to the second polarizing TIR prism, reflected by the second TIR prism to the second displaying chip, redirected by the second displaying chip to the second polarizing TIR prism, and then transmitted into the light combining prism via the second polarizing TIR prism. The light combining prism is adapted to combine the incident first polarized light with the incident second polarized light and transfer the combined light to the imaging lens. The imaging lens is adapted to correct and amplify the combined light transferred by the dual-chip light splitting and light combining module and project the light outwards.

According to a preferred embodiment of the present disclosure, the light splitting prism is a polarizing light splitting prism.

According to a preferred embodiment of the present disclosure, the light splitting prism is adapted to split the incident non-polarized light into the first polarized light and the second polarized light perpendicular to each other.

According to a preferred embodiment of the present disclosure, the first displaying chip is one of an MEMS mirror or a DMD; and the second displaying chip is one of an MEMS mirror or a DMD.

According to a preferred embodiment of the present disclosure, the first displaying chip and the second displaying chip have a refreshing frequency of 60 Hz.

As compared to the prior art, the present disclosure has the following benefits: the 3D projection optical system of the present disclosure adopts a dual-chip structure. When an MEMS mirror dual-chip structure is adopted, the 3D function can be achieved at a refreshing frequency of above 60 Hz. This greatly eases the requirements of the 3D function on the refreshing frequency of the displaying chip and, meanwhile, improves the light utilization factor. Moreover, because a same lens is used for the projection optical lens and the light source lens, calibration becomes convenient and the structure becomes simple.

DETAILED DESCRIPTION OF THE INVENTION

Figure 1:
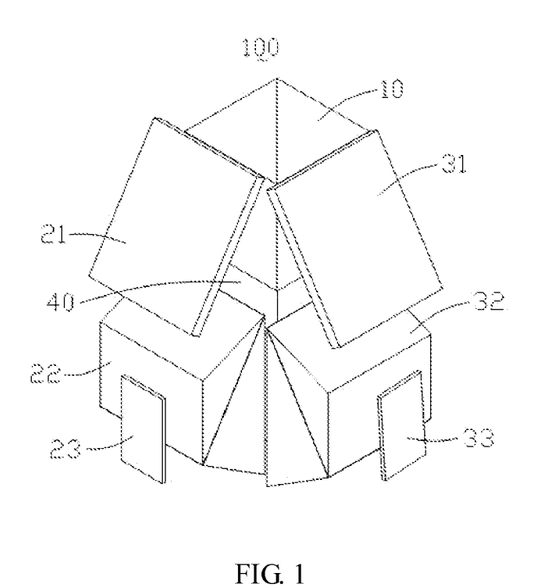
FIG. 1 is a schematic structural view of a dual-chip light splitting and light combining module according to an embodiment of the present disclosure.
Figure 2:
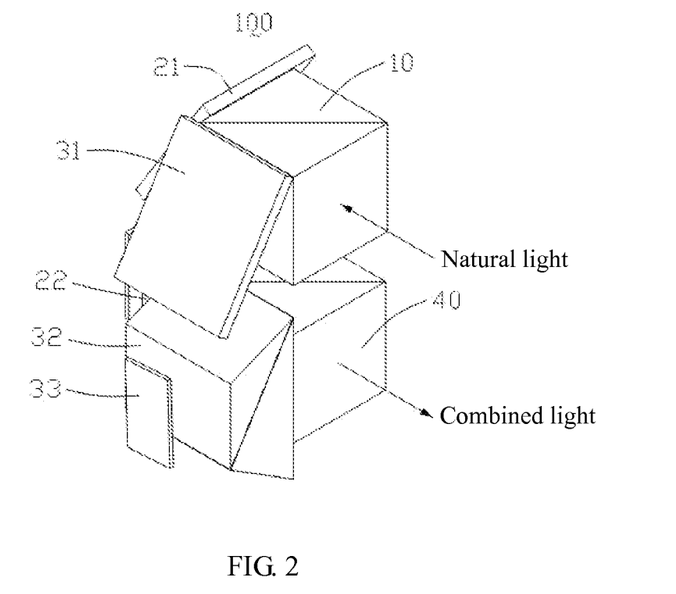
FIG. 2 is a schematic structural view of the dual-chip light splitting and light combining module of FIG. 1 from another viewing angle.

FIG. 1 is a schematic structural view of a dual-chip light splitting and light combining module according to an embodiment of the present disclosure. FIG. 2 is a schematic structural view of the dual-chip light splitting and light combining module of FIG. 1 from another viewing angle. As shown in FIG. 1 and FIG. 2, an embodiment of the present disclosure provides a dual-chip light splitting and light combining module 100. The dual-chip light splitting and light combining module 100 comprises a light splitting prism 10, a first mirror 21, a first polarizing total internal reflection (TIR) prism 22, a first displaying chip 23, a second mirror 31, a second polarizing TIR 32, a second displaying chip 33 and a light combining prism 40.

Figure 2A:
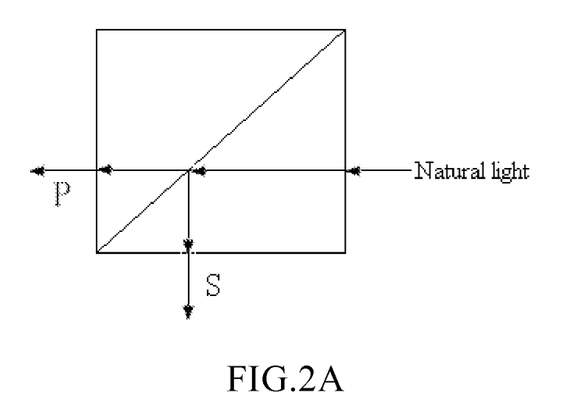
FIG. 2A illustrates optical principals of the dual-chip light splitting and light combining module according to the embodiment of the present disclosure.

FIG. 2A illustrates optical principals of the dual-chip light splitting and light combining module 100 according to the embodiment of the present disclosure. As shown in FIG.2A, the light splitting prism 10 is adapted to split the incident light into a first polarized light and a second polarized light. In this embodiment, the light splitting prism 10 is a polarizing light splitting prism. In this embodiment, a natural light that has been shaped propagates into the light splitting prism 10 and is split by the light splitting prism 10 into a first polarized light P and a second polarized light S perpendicular to each other.

Figure 3:
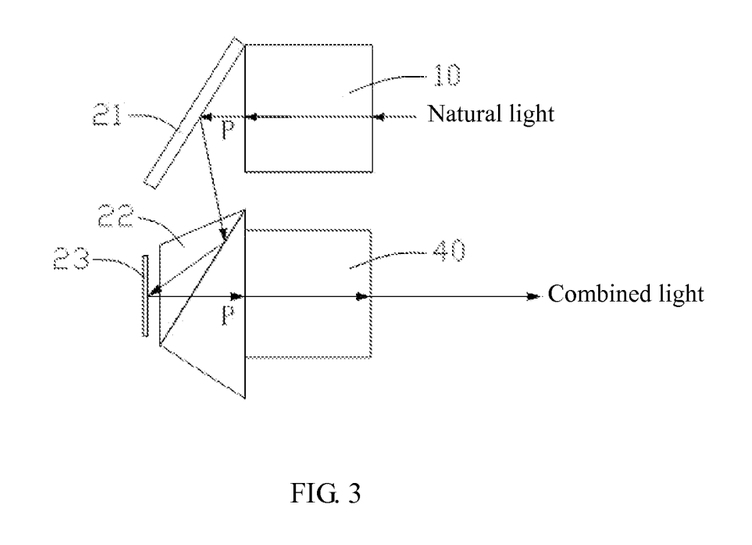
FIG. 3 illustrates optical principals of the dual-chip light splitting and light combining module according to the embodiment of the present disclosure.

FIG. 3 illustrates optical principals of the dual-chip light splitting and light combining module 100 according to the embodiment of the present disclosure. As shown in FIG. 3, the first polarized light P propagates through the light splitting prism 10 to the first mirror 21 and is reflected by the first mirror 21 into the first polarizing TIR prism 22. The first polarized light P that satisfies the total reflection conditions is totally reflected by the first polarizing TIR prism 22 to the first displaying chip 23. Then, the first polarized light P is redirected by the first displaying chip 23 to the first polarizing TIR prism 22, and the first polarized light P that satisfies the total transmission conditions totally transmits through the first polarizing TIR prism 22 to the combining prism 40.

Figure 3A:
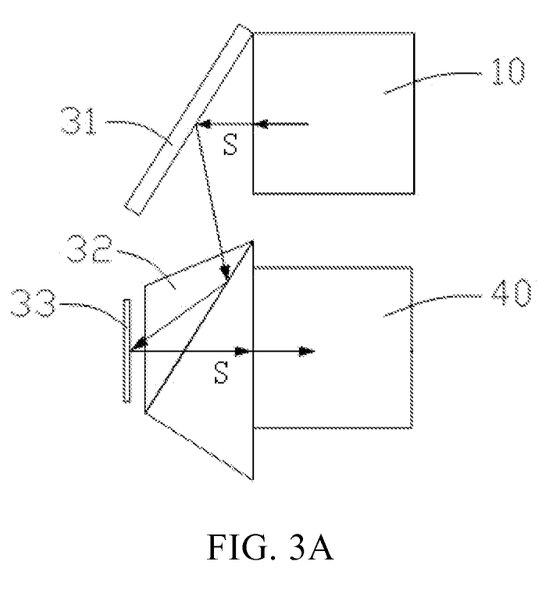
FIG. 3A illustrates optical principals of the dual-chip light splitting and light combining module according to the embodiment of the present disclosure.

As shown in FIG. 2A, after being split by the light splitting prism 10, the second polarized light S is reflected at a reflection angle of 45°, and exits at an angle of 90° relative to the first polarized light P. FIG. 3A illustrates optical principals of the dual-chip light splitting and light combining module 100 according to the embodiment of the present disclosure. As shown in FIG.3A the second polarized light S propagates to the second mirror 31 and is reflected by the second mirror 31 into the second polarizing TIR prism 32. The second polarized light S that satisfies the TIR conditions is totally reflected by the second polarizing TIR prism 32 to the second displaying chip 33. Then, the second polarized light S is redirected by the second displaying chip 33 into the second polarizing TIR prism 32, and the second polarized light S satisfying the total transmission conditions totally transmits through the second polarizing TIR prism 32 into the combining prism 40.

The combining prism 40 combines the incident first polarized light P with the incident second polarized light S.

In this embodiment, the first displaying chip 23 may be one of an MEMS mirror and a DMD. The second displaying chip 33 may also be one of an MEMS mirror and a DMD. When an MEMS mirror dual-chip structure is adopted, the 3D function can be achieved when a refreshing frequency of the first displaying chip and the second displaying chip is above 60 Hz, and this greatly eases the requirements of the 3D function on the refreshing frequency of the chips.

Figure 4:
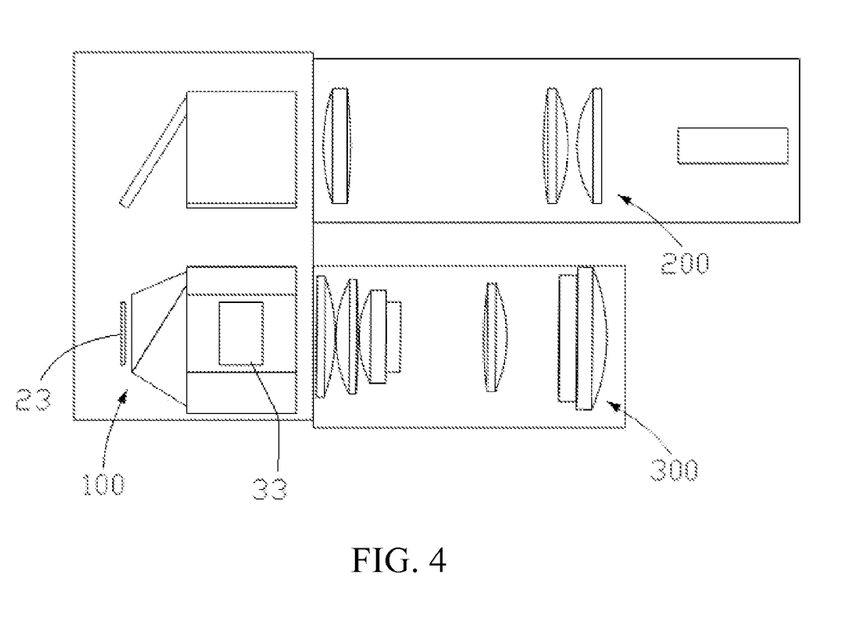
FIG. 4 is a schematic structural plan view of a 3D projection optical system according to an embodiment of the present disclosure.
Figure 5:
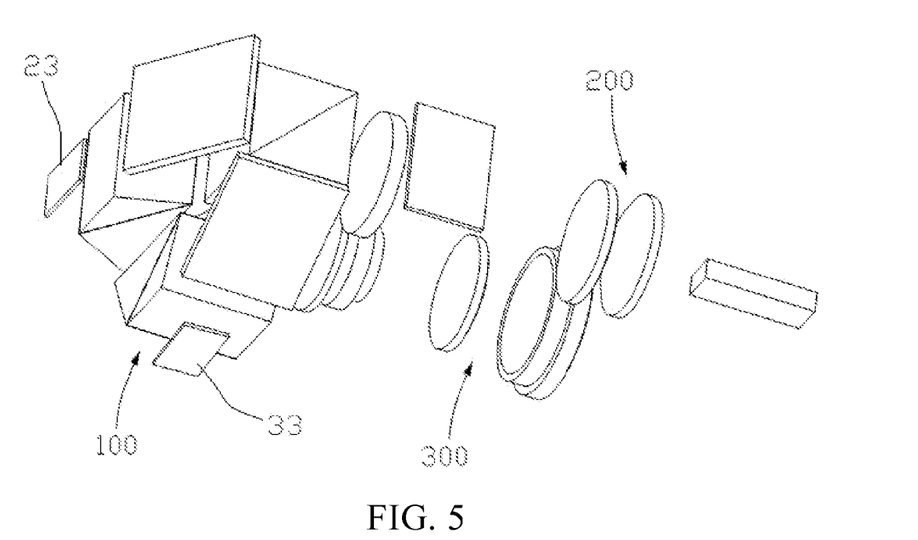
FIG. 5 is a schematic exploded perspective view illustrating a structure of the 3D projection optical system according to the embodiment of the present disclosure.
Figure 6:
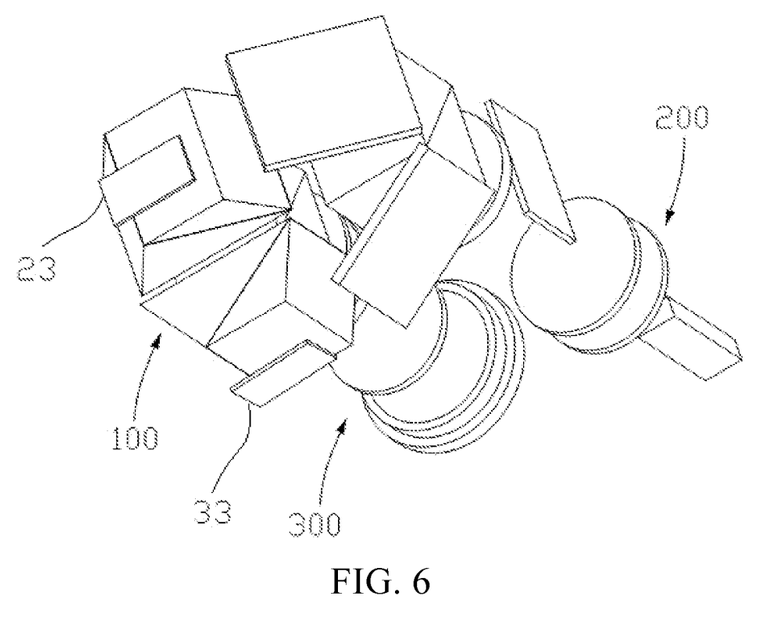
FIG. 6 is a schematic exploded perspective view illustrating a structure of the 3D projection optical system of FIG. 5 from another viewing angle.

Another embodiment of the present disclosure further provides a 3D projection optical system comprising the dual-chip light splitting and light combining module 100 described in the previous embodiment. FIG. 4 is a schematic structural plan view of a 3D projection optical system according to an embodiment of the present disclosure. FIG. 5 is a schematic exploded perspective view illustrating a structure of the 3D projection optical system according to the embodiment of the present disclosure. FIG. 6 is a schematic exploded perspective view illustrating a structure of the 3D projection optical system of FIG. 5 from another viewing angle. As shown in FIG. 4, FIG. 5 and FIG. 6, the 3D projection optical system comprises a light source shaping lens 200, a dual-chip light splitting and light combining module 100 and an imaging module 300.

The structure and operation principles of the dual-chip light splitting and light combining module 100 are just as described in the previous embodiment and, thus, will not be further described herein.

In this embodiment, the dual-chip light splitting and light combining module 100 splits a non-polarized light incident from the light source shaping lens 200 into a first polarized light P and a second polarized light S and combines the first polarized light P and the second polarized light S into the imaging lens 300. Then, the imaging lens 300 corrects and amplifies the combined light for projection to a metal screen.

Because, from the first polarized light P and the second polarized light S, two different frames can be imaged on the metal screen by the first displaying chip 23 and the second displaying chip 33 different from each other, and the two different frames can be distinguished by the left-eye and the right-eye eyeglasses, different chips can be used in the 3D projection optical system of the present disclosure to control the left-eye and the right-eye eyeglasses to obtain a 3D image easily. Meanwhile, the 3D projection optical system of the present disclosure can also provide a high-brightness two-dimensional (2D) image by superimposing two identical frames.

As compared to the prior art, the present disclosure has the following benefits: the 3D projection optical system of the present disclosure adopts a dual-chip structure. When an MEMS mirror dual-chip structure is adopted, the 3D function can be achieved at a refreshing frequency of above 60 Hz. This greatly eases the requirements of the 3D function on the refreshing frequency of the displaying chip and, meanwhile, improves the light utilization factor. Moreover, because a same lens is used for the projection optical lens and the light source lens, calibration becomes convenient and the structure becomes simple.

What described above are only the embodiments of the present disclosure, but are not intended to limit the scope of the present disclosure. Any equivalent structures or equivalent process flow modifications that are made according to the specification and the attached drawings of the present disclosure, or any direct or indirect applications of the present disclosure in other related technical fields shall all be covered within the scope of the present disclosure.

What is claimed is:

1. A dual-chip light splitting and light combining module, comprising a polarizing light splitting prism, a first mirror, a first polarizing total internal reflection (TIR) prism, a first displaying chip, a second mirror, a second polarizing TIR prism, a second displaying chip and a light combining prism, the polarizing light splitting prism being adapted to split an incident non-polarized light into a first polarized light and a second polarized light perpendicular to each other, wherein:
the first polarized light is reflected by the first mirror to the first polarizing TIR prism, reflected by the first TIR prism to the first displaying chip, redirected by the first displaying chip to the first polarizing TIR prism, and then transmitted into the light combining prism via the first polarizing TIR prism;
the second polarized light is reflected by the second mirror to the second polarizing TIR prism, reflected by the second TIR prism to the second displaying chip, redirected by the second displaying chip to the second polarizing TIR prism, and then transmitted into the light combining prism via the second polarizing TIR prism; and
the light combining prism is adapted to combine the incident first polarized light with the incident second polarized light.

2. The dual-chip light splitting and light combining module of claim 1, wherein:
the first displaying chip is one of a microelectromechanical system (MEMS) mirror or a digital mirror device (DMD); and
the second displaying chip is one of an MEMS mirror or a DMD.

3. The dual-chip light splitting and light combining module of claim 1, wherein the first displaying chip and the second displaying chip have a refreshing frequency of 60 Hz.

4. A dual-chip light splitting and light combining module, comprising a light splitting prism, a first mirror, a first polarizing total internal reflection (TIR) prism, a first displaying chip, a second mirror, a second polarizing TIR prism, a second displaying chip and a light combining prism, the light splitting prism being adapted to split an incident non-polarized light into a first polarized light and a second polarized light, wherein:
the first polarized light is reflected by the first mirror to the first polarizing TIR prism, reflected by the first TIR prism to the first displaying chip, redirected by the first displaying chip to the first polarizing TIR prism, and then transmitted into the light combining prism via the first polarizing TIR prism;
the second polarized light is reflected by the second mirror to the second polarizing TIR prism, reflected by the second TIR prism to the second displaying chip, redirected by the second displaying chip to the second polarizing TIR prism, and then transmitted into the light combining prism via the second polarizing TIR prism; and
the light combining prism is adapted to combine the incident first polarized light with the incident second polarized light.

5. The dual-chip light splitting and light combining module of claim 4, wherein the light splitting prism is a polarizing light splitting prism.

6. The dual-chip light splitting and light combining module of claim 4, wherein the light splitting prism is adapted to split the incident non-polarized light into the first polarized light and the second polarized light perpendicular to each other.

7. The dual-chip light splitting and light combining module of claim 4, wherein:
the first displaying chip is one of a microelectromechanical system (MEMS) mirror or a digital mirror device (DMD); and
the second displaying chip is one of an MEMS mirror or a DMD.

8. The dual-chip light splitting and light combining module of claim 4, wherein the first displaying chip and the second displaying chip have a refreshing frequency of 60 Hz.

9. A three-dimensional (3D) projection optical system, comprising a light source shaping lens, a dual-chip light splitting and light combining module, and an imaging lens, wherein:
the dual-chip light splitting and light combining module comprises a light splitting prism, a first mirror, a first polarizing total internal reflection (TIR) prism, a first displaying chip, a second mirror, a second polarizing TIR prism, a second displaying chip and a light combining prism, the light splitting prism being adapted to split a non-polarized light incident from the light source shaping lens into a first polarized light and a second polarized light, wherein:

the first polarized light is reflected by the first mirror to the first polarizing TIR prism, reflected by the first TIR prism to the first displaying chip, redirected by the first displaying chip to the first polarizing TIR prism, and then transmitted into the light combining prism via the first polarizing TIR prism;

the second polarized light is reflected by the second mirror to the second polarizing TIR prism, reflected by the second TIR prism to the second displaying chip, redirected by the second displaying chip to the second polarizing TIR prism, and then transmitted into the light combining prism via the second polarizing TIR prism; and the light combining prism is adapted to combine the incident first polarized light with the incident second polarized light and transfer the combined light to the imaging lens; and the imaging lens is adapted to correct and amplify the combined light transferred by the dual-chip light splitting and light combining module and project the light outwards.

10. The 3D projection optical system of claim 9, wherein the light splitting prism is a polarizing light splitting prism.

11. The 3D projection optical system of claim 9, wherein the light splitting prism is adapted to split the incident non-polarized light into the first polarized light and the second polarized light perpendicular to each other.

12. The 3D projection optical system of claim 9, wherein:

the first displaying chip is one of a microelectromechanical system (MEMS) mirror or a digital mirror device (DMD); and the second displaying chip is one of an MEMS mirror or a DMD.

13. The 3D projection optical system of claim 9, wherein the first displaying chip and the second displaying chip have a refreshing frequency of 60 Hz.

* * * * *